United States Patent
Lee

(10) Patent No.: US 12,553,135 B2
(45) Date of Patent: Feb. 17, 2026

(54) THIOL-ENE BASED BETA-DIKETONE PRIMERS FOR ADHESION TO METAL

(71) Applicant: 3M INNOVATIVE PROPERTIES COMPANY, St. Paul, MN (US)

(72) Inventor: Hae-Seung Harry Lee, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 279 days.

(21) Appl. No.: 18/578,331

(22) PCT Filed: Jun. 29, 2022

(86) PCT No.: PCT/IB2022/056055
§ 371 (c)(1),
(2) Date: Jan. 11, 2024

(87) PCT Pub. No.: WO2023/012542
PCT Pub. Date: Feb. 9, 2023

(65) Prior Publication Data
US 2024/0301559 A1    Sep. 12, 2024

Related U.S. Application Data

(60) Provisional application No. 63/203,838, filed on Aug. 2, 2021.

(51) Int. Cl.
*C23C 22/02* (2006.01)
*C09D 163/00* (2006.01)

(52) U.S. Cl.
CPC ............ *C23C 22/02* (2013.01); *C09D 163/00* (2013.01)

(58) Field of Classification Search
None
See application file for complete search history.

(56) References Cited

U.S. PATENT DOCUMENTS

| | | | |
|---|---|---|---|
| 3,496,250 | A | 2/1970 | Czerwinski |
| 4,948,449 | A | 8/1990 | Tarbutton et al. |
| 5,288,802 | A | 2/1994 | Walters et al. |
| 5,629,380 | A | 5/1997 | Baldwin et al. |
| 5,913,970 | A | 6/1999 | Atkins et al. |
| 8,618,204 | B2 | 12/2013 | Campbell et al. |
| 2005/0107557 | A1* | 5/2005 | Moren ............ C09J 4/00 524/556 |
| 2007/0027233 | A1 | 2/2007 | Yamaguchi et al. |
| 2009/0308534 | A1 | 12/2009 | Malone |
| 2013/0037213 | A1 | 2/2013 | Frick et al. |
| 2014/0255638 | A1* | 9/2014 | Imai ............ C09J 7/387 451/28 |
| 2016/0376448 | A1* | 12/2016 | Powell ............ C09D 5/086 427/388.1 |

FOREIGN PATENT DOCUMENTS

| | | | | |
|---|---|---|---|---|
| WO | 2003057743 | A2 | 7/2003 | |
| WO | 2015183782 | A1 | 12/2015 | |
| WO | 2016145359 | A1 | 9/2016 | |
| WO | WO-2019064103 | A1 * | 4/2019 | ............ C08L 81/02 |
| WO | 2019239346 | A1 | 12/2019 | |
| WO | WO-2019239273 | A1 * | 12/2019 | ............ C08G 75/045 |
| WO | 2020217161 | A1 | 10/2020 | |

OTHER PUBLICATIONS

Nesbitt—beta-diketone coupling agents—IDS—PCT D1—J. Adhesion—2008 (Year: 2008).*
International Search report for PCT International Application No. PCT/IB2022/056055, mailed on Oct. 11, 2022, 5 pages.
Martinez, "The Inhibition of Copper-Nickel Alloy Corrosion Under Controlled Hydrodynamic Condition in Seawater", Journal of Applied Electrochemistry, 2006, vol. 36, pp. 1311-1315.
Nesbitt, "Evaluation of β-diketone-containing Polymeric Coupling Agents for Enhancing the Adhesion of Epoxy to Aluminum", The Journal of Adhesion, Jan. 2000, vol. 72, No. 3-4, pp. 245-268.
Eastman™ AAEM (acetoacetoxyethyl methacrylate) Acetoacetyl chemistry Technical Report, Eastman Chemical Company, Jan. 2013, pp. 1-10.
Utility of Eastman™ AAEM (acetoacetoxyethyl methacrylate) in thermoset coatings Technical Report, Eastman Chemical Company, Dec. 2012, pp. 1-15.
Eastman™ Acetoacetoxyethyl Methacrylate as a reactive copromoter/ diluent in unsaturated polester resins Technical Report, Eastman Chemical Company, Oct. 2008, pp. 1-7.

* cited by examiner

*Primary Examiner* — John Vincent Lawler

(57) ABSTRACT

A reactive primer compound is provided that can be used as an adhesion promoter on various substrates, particularly metal-containing substrates. The reactive primer compound has a diketone group that can form chelates with various metals through coordination chemistry plus an oxirane group that can undergo ring opening reactions with components of an adhesive or coating composition. Articles containing a metal-containing substrate and a primer layer, which includes the reactive primer compound, positioned adjacent the metal-containing substrate are also provided. The articles can further include a cured composition or a cured composition formed therefrom, wherein the curable composition typically includes an epoxy resin and a curative for the epoxy resin.

19 Claims, No Drawings

THIOL-ENE BASED BETA-DIKETONE PRIMERS FOR ADHESION TO METAL

CROSS REFERENCE TO RELATED APPLICATIONS

This application is a national stage filing under 35 U.S.C. 371 of PCT/IB2022/056055, filed Jun. 29, 2022, which claims the benefit of U.S. Provisional Patent Application No. 63/203,838, filed Aug. 2, 2021, the disclosure of which is incorporated by reference in its/their entirety herein.

BACKGROUND

Various adhesives can be used to bond a first surface to a second surface. To increase the adhesion of the adhesive to one or both surfaces, various adhesion promoters have been used. For example, various adhesion promoter having an epoxide group and a hydrolyzable silyl group have been described in U.S. Pat. No. 8,618,204 (Campbell et al.) and in PCT patent application publications WO 2019/239346 (Lee et al.) and WO 2020/217161 (Lee et al.).

Acetoacetate is known for its ability to form chelates with various metals through coordinate chemistry. Generally, materials with a diketone group (—(C=O)—$CH_2$—(C=O)—) exist in equilibrium with keto-enol tautomers and can readily form acetylacetonate anions upon losing a methylene proton. The acetylacetonate anions have strong affinity to metals. Due to this metal binding ability, researchers have attempted to develop adhesion promoters or primers for metal bonding applications based on this chemistry. Eastman Chemical Company developed and commercialized 2-(methacrylolyloxy)ethyl acetoacetate (CAS #21282-97-3) for use in various (meth)acrylate polymers for improved adhesion to metal substrates. However, further research indicated that copolymers with 2-(methacrylolyloxy)ethyl acetoacetate did not show improved performance with aluminum (see Nesbit et al., The Journal of Adhesion, 2000, Vol 72, pp 245-268).

There is an ongoing interest in increasing the adhesion between the adhesive composition and various surfaces. More specifically, there is an increasing interest in increasing the adhesion of the adhesive composition to inorganic surfaces such as, for example, metallic surfaces.

SUMMARY

A reactive primer compound is provided that can be used as an adhesion promoter on various substrates, particularly metal-containing substrates. The reactive primer compound has a diketone group that can form chelates with various metals through coordination chemistry plus an oxirane group that can undergo ring opening reactions with components of the adhesive composition. Articles containing a metal-containing substrate and a primer layer, which includes the reactive primer compound, positioned adjacent to the substrate are also provided. The articles can further include a cured composition, or a cured composition formed therefrom, wherein the curable composition typically includes an epoxy resin and a curative for the epoxy resin.

In a first aspect, a reactive primer compound is provided that comprises a thiol-ene reaction product of a mixture comprising (a) a first compound comprising at least two thiol groups, (b) a second compound comprising an ethylenically unsaturated group and a diketone group of formula —(CO)—$CH_2$—(CO)—; and (c) a third compound comprising an ethylenically unsaturated group and an oxirane group.

In a second aspect, an article is provided that includes (1) a first metal-containing substrate and (2) a first surface of a first primer layer positioned adjacent to the metal-containing substrate, wherein the first primer layer comprises a first reactive primer compound described in the first aspect. The first reactive primer compound can form a chelate with a metal in the first metal-containing substrate.

The article of the second aspect can further include a curable composition positioned adjacent to the first primer layer opposite the first metal-containing substrate. The curable composition comprises an epoxy resin and a curative for the epoxy resin. Still further, the article can include multiple layers arranged in the following order: a first metal-containing substrate, a first primer layer, a curable composition, a second primer layer and a second metal-containing substrate. The second primer layer, like the first primer layer, comprises the reactive primer compound described in the first aspect. The curable composition if often a precursor for a coating composition or an adhesive composition such as a structural or semi-structural composition. The curable compositions in any of the articles can be cured. The cured composition is covalently bonded to the first primer layer, the second primer layer, or both.

As used herein, the terms "a", "an", and "the" are all equivalent to "at least one of" and encompass embodiments having plural referents, unless the context clearly dictates otherwise.

The term "or" is generally employed in its sense including "and/or" unless the context clearly dictates otherwise. The term "and/or" such as A and/or B means A alone, B alone, or both A and B.

The term "ethylenically unsaturated group" refers to monovalent group that contains a $CH_2$=CR— group where R is hydrogen or methyl. The ethylenically unsaturated group is often a vinyl group or the reactive portion of an allyl group of formula $CH_2$=CR—$CH_2$— or a (meth)acryloyl group of formula $CH_2$=CR—(C=O)—. (Meth)acryloyl groups are often part of a (meth)acryloyloxy ($CH_2$=CR—(C=O)—O—) or (meth)acrylolylimino ($CH_2$=CR—(C=O)—NH—) group.

The term "ene" refers to refers to the monovalent group $CH_2$=CR— where R is hydrogen or methyl. That is, the ene group can be a vinyl group or the reactive part of an ally or (meth)acryloyl group.

The term "thiol" refers to a monovalent group-SH.

The term "heterohydrocarbon" refers to a compound having heteroatoms such as S, N, or O in addition to carbon and hydrogen.

The term "heterocyclic" refers to a ring structure having a heteroatom ring member such as S, N, or O.

The term "oxirane group" refers to a monovalent group that contains a three membered ring with an oxygen ring member.

The term "diketone group" refers to a divalent group of formula —(C=O)—$CH_2$—(C=O)—. In many embodiments, one of the carbonyl groups is attached to an alkyl such as methyl. This group can be also referred to interchangeably as an "acetoacetate group".

The term "alkyl" refers to a monovalent group that is a radical of an alkane and includes groups that are linear, branched, cyclic, bicyclic, or a combination thereof. Unless otherwise indicated, the alkyl groups typically contain from 1 to 30 carbon atoms but cycloalkyl groups have at least 3 carbon atoms and bicyclic groups typically have at least 6 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Example alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a di-radical of an alkane and includes groups that are linear, branched, cyclic, bicyclic, or a combination thereof. Unless otherwise indicated, the alkylene group typically has 1 to 30 carbon atoms but a cyclic group has at least 3 carbons and a bicyclic group typically has at least 6 carbon atoms. In some embodiments, the alkylene group has 1 to 20 carbon atoms, 1 to 10 carbon atoms, 1 to 6 carbon atoms, 1 to 4 carbon atoms, or 1 to 3 carbon atoms. Example alkylene groups include methylene, ethylene, 1,3-propylene, 1,2-propylene, 1,4-butylene, 1,4-cyclohexylene, and 1,4-cyclohexyldimethylene.

The term "alkoxy" refers to a group of formula —$OR^a$ where $R^a$ is an alkyl as defined above.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms or 6 to 10 carbon atoms.

The term "aralkyl" refers to an alkyl group substituted with at least one aryl group. That is, the aralkyl group is of formula —$R^d$—Ar where $R^d$ is an alkylene and Ar is an aryl. The aralkyl group contains 6 to 40 carbon atoms. The aralkyl group often contains an alkylene group having 1 to 20 carbon atoms or 1 to 10 carbon atoms and an aryl group having 5 to 20 carbon atoms or 6 to 10 carbon atoms.

The term "alkaryl" refers to an aryl group substituted with at least one alkyl group. That is, the aralkyl group is of formula $R^e$—Ar where $R^e$ is an alkyl and Ar is an aryl. The alkaryl group contains 6 to 40 carbon atoms. The aralkyl group often contains an alkylene group having 1 to 20 carbon atoms or 1 to 10 carbon atoms and an aryl group having 5 to 20 carbon atoms or 6 to 10 carbon atoms The term "reactive primer compound" refers to a compound having a reactive epoxy group prior plus a diketone group. The term "reacted primer compound" refers to a reaction product of the reactive primer compound with another compound that results in ring opening of the epoxy group.

The term "aliphatic" refers to a non-aromatic group or compound. The aliphatic group or compound can be a hydrocarbon or can include heteroatoms such as oxygen, nitrogen, and sulfur. In some instances, the aliphatic group can have 1 to 40 carbon atoms or 1 to 30 carbon atoms. The aliphatic group or compound can be saturated or unsaturated (but not aromatic).

The term "aromatic" refers an aromatic group or compound that typically has 3 to 40 carbon atoms or 3 to 30 carbon atoms. The aromatic group or compound can be carbocyclic or can be heterocyclic containing one or more of the heteroatoms (O, N, or S) and typically has at least 5 ring members. The aromatic ring can have one ring or can have multiple fused or attached rings that are each carbocyclic or heterocyclic.

The term "curable" refers to a composition or component that can be cured. The terms "cure" and "cured" refer to joining polymer chains together by covalent chemical bonds, usually via crosslinking molecules or groups, to form a polymeric network. Therefore, the terms "cured" and "crosslinked" may be used interchangeably. A cured or crosslinked polymer is generally characterized by insolubility in a fluid (e.g., solvent, water, or combination thereof) but may be swellable in the presence of an appropriate fluid.

The term "curable component" as used herein refers to the curable composition minus any optional inorganic filler that may be present. As used herein, the curable component includes at least the epoxy resin and a curing agent for the epoxy resin. It can include other optional materials, which may or may not be reactive, such as a catalyst, toughening agent, organic solvent, and the like.

The term "curable composition" refers to a total reaction mixture that is subjected to curing. As used herein, the curable composition contains both a curable component and optional inorganic fillers.

The term "cured composition" refers to a cured product of a curable composition. It includes the cured product of the curable component plus any optional inorganic filler.

The recitation of numerical ranges by endpoints includes the endpoints, all numbers within that range (e.g., 1 to 5 includes 1, 1.5, 2, 2.75, 3, 3.80, 4, and 5), and any range within that range.

DETAILED DESCRIPTION

A reactive primer compound and articles containing the reactive primer compound are provided. The reactive primer compound has 1) at least one diketone group that can form a chelate with metals in various metal-containing substrates through coordination chemistry and 2) at least one oxirane group that can undergo a ring opening reaction with another component of an adhesive or coating composition.

An article containing a reactive primer compound layer positioned adjacent to a metal-containing substrate is also provided. The article can optionally further include a cured composition, which is typically an adhesive or coating composition, positioned adjacent to the reactive primer layer opposite the metal-containing substrate.

When the reactive primer compound is included in a primer layer positioned between the metal-containing substrate and the adhesive or coating composition, the adhesive or coating composition tends to adhere more effectively to the metal-containing substrate. The reactive primer compound is particularly effective for binding to various zinc-containing substrates such as galvanized steel or to various copper-containing substrates such as copper, brass, and bronze. Surprisingly, use of the reactive primer compounds described herein are more effective at increasing adhesion of an adhesive or coating composition to a substrate than using a polymeric primer having both 1) a pendant oxirane group and 2) a pendant diketone group.

Reactive Primer Compound

The reactive primer compound is a reaction product of a reaction mixture that includes three different types of compounds. The first compound has at least two thiol groups. The second compound contains an ethylenically unsaturated group and a diketone group while the third compound contains an ethylenically unsaturated group and oxirane group. The second compound and the third compound each have a terminal ethylenically unsaturated group (i.e., a terminal ene group of formula $CH_2=CR^1-$ where $R^1$ is hydrogen or methyl) that can react with a thiol group of the first compound. The reactive primer has at least one diketone group and at least one oxirane group.

A general reaction scheme to form the reactive primer compound is shown in Reaction Scheme A. $Q^1$ in the first compound (1) is the residue of this compound minus the two thiol groups. $Q^2$ in second compound (2) is the residue of the second compound minus both the ene group and the diketone group. $Q^3$ in the third compound (3) is the residue of the third compound minus both the ene group and the oxirane group. The product, which is an example reactive primer compound, has both an oxirane group and a diketone group. As noted above, however, the reactive primer compound can have more than one oxirane group and/or more than one diketone group. That is, the first compound can have more than two thiol groups but is shown with only two thiol groups for ease of explanation.

Reaction Scheme A

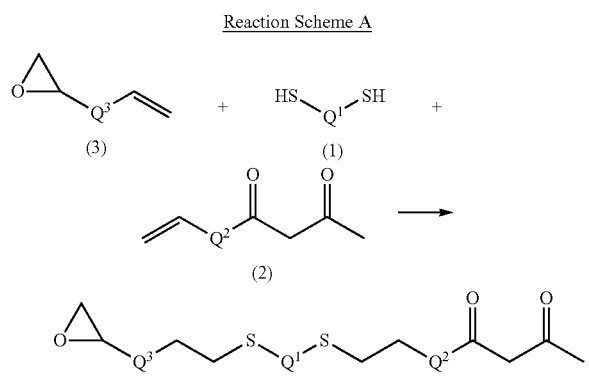

Each of the first, second, and third compounds are described more completely below.

First Compound Having a Plurality of Thiol Groups

The first compound included in the reaction mixture to form the reactive primer compound contains at least two thiol groups. There are often two, three, or four thiol groups but more can be used, if desired. If the first compound has more than two thiol groups, there can be 0, 1, 2, or more unreacted thiol groups in the reactive primer compound.

The first compound is a heterohydrocarbon compound and usually contains other heteroatoms in addition to the at least two thiol groups. For example, the heterohydrocarbon compound often contains an oxy group (—O—), imino group (—NH—), carbonyl group (—(C=O)—), carbonyloxy group (—(C=O)—O—), carbonylimino group (—(C=O)—NH—), ether group (i.e., alkylene-oxy-alkylene group), oxy-alkylene group, oxy-alkylene-oxy group, heterocylic ring, or the like, and combination thereof. The molecular weight (weight average molecular weight) of the first compound is often no greater than 1000 but higher molecular weight first compounds can be used, if desired. The molecular weight if often no greater than 900, no greater than 800, no greater than 600, no greater than 500, no greater than 400, or no greater than 300 grams/mole Some example first compounds are of Formula (I) and have more than two thiol groups.

(I)

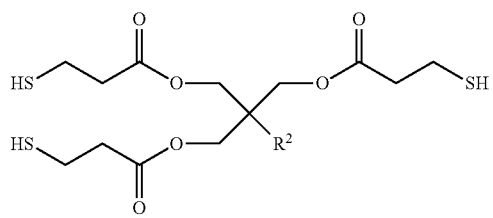

In Formula (I), group $R^2$ is methyl, ethyl, or —CH$_2$—O—(C—O)—CH$_2$CH$_2$—SH. Compounds of Formula (I) have three or four carbonyloxy groups. Example first compounds that are of Formula (I) include pentaerythritol tetrakis(3-mercaptopropionate), trimethylolpropane tris(3-mercaptopropionate), and 2-hydroxymethyl-2-methyl-1,3-propanediol tris-(3-mercaptopropionate). After rection with both the second and the third compound, there can be 0, 1, or 2 unreacted thiol groups in the resulting reactive primer compound.

Another first compound that has more than two thiol groups is tris[2-(3-mercaptopropionyloxy)ethyl] isocyanurate.

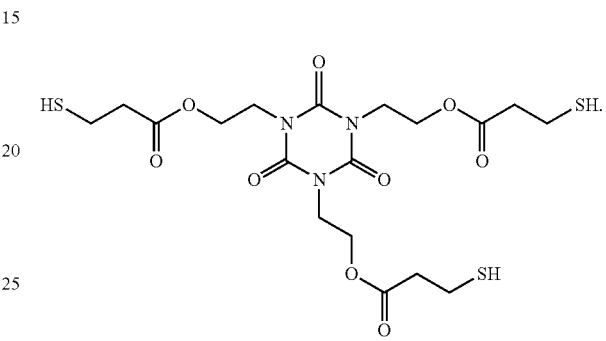

After rection with both the second and the third compound, there can be 0 or 1 unreacted thiol groups in the resulting reactive primer compound.

Some first compounds have only two thiol groups such as those of Formula (II) that include an ether or polyether group.

(II)

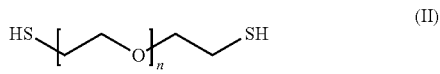

The variable n in Formula (II) is usually an integer in a range of 1 to 10 but can be larger, if desired. First compounds of Formula (II) include, for example, 2,2'-(ethylenedioxy)diethanethiol, tetra(ethylene glycol) dithiol 1, hexa(ethylene glycol) dithiol 1, and ethylene glycol bis-mercaptoacetate. After rection with both the second and the third compound, there can be no unreacted thiol groups in the resulting reactive primer compound.

Other first compounds that have only two thiol groups are of Formula (III).

(III)

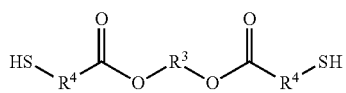

In Formula (III), group $R^4$ is an alkylene having 1 to 4 carbon atoms and group $R^3$ is an alkylene having 1 to 6 carbon atoms. First compounds of Formula (III) include, for example, 1,4-butanediol bis(3-mercaptopropionate) and ethylene glycol bis-mercaptoacetate. After rection with both the second and the third compound, there can be no unreacted thiol groups in the resulting reactive primer compound.

Second Compound Having an Ethylenically Unsaturated Group and a Diketone Group

The second compound included in the reaction mixture to form the reactive primer compound contains an ethylenically unsaturated group plus a diketone group. Although the second compound can include more than one ethylenically unsaturated group and/or more than one diketone group, most second compounds contain only one of each type of group. The ethylenically unsaturated group, which has an ene group, can react with a thiol group in the first compound.

The second compound is a heterohydrocarbon compound and optionally contains heteroatoms in addition to those included in the diketone group. These other groups can be an oxy group, imino group, carbonyloxy group, carbonylimino group, oxy-alkylene group, oxy-alkylene-oxy group, alkylene-oxy-alkylene group, heterocyclic ring, or the like and combinations thereof. The molecular weight (weight average molecular weight) of the second compound is often no greater than 1000, no greater than 900, no greater than 800, no greater than 600, no greater than 500, no greater than 400, or no greater than 300 grams/mole but higher molecular weight second compound can be used, if desired.

Some example second compounds contain an allyl group such as in compounds of Formula (IV).

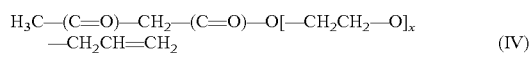

$$H_3C—(C=O)—CH_2—(C=O)—O[—CH_2CH_2—O]_x—CH_2CH=CH_2 \quad (IV)$$

wherein the variable x is usually 0 or 1 but can be a larger number such as up to 5, up to 4, up to 3, or up to 2. These examples contain an oxy or at least one oxy-alkylene-oxy group between the allyl and diketone groups. Examples of second compounds of Formula (IV) are 4-allylacetoacetate and 2-(allyloxy)ethyl acetoacetate.

Other example second compounds contain an ene group separated from the diketone group by an alkylene group. Such compounds are of Formula (V)

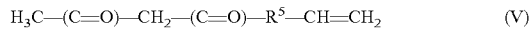

$$H_3C—(C=O)—CH_2—(C=O)—R^5—CH=CH_2 \quad (V)$$

where $R^5$ is an alkylene having 2 to 6 carbon atoms. Examples of second compounds of Formula
(V) are non-8-ene-2,4-dione and dec-9-ene-2,4-dione.

Still other example second compounds contain a (meth) acryloyloxy group. Such second compounds are often of Formula (VI)

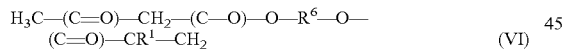

$$H_3C—(C=O)—CH_2—(C—O)—O—R^6—O—(C=O)—CR^1—CH_2 \quad (VI)$$

wherein $R^6$ is an alkylene having 2 to 6 carbon atoms and $R^1$ is hydrogen or methyl. Examples of second compounds of Formula (VI) are 2-(methacryloyloxy)ethyl acetoacetate and 2-(acryloyloxy)ethyl acetoacetate, and 1-(prop-2-enoyloxy) propan-2-yl 3-oxabutaneoate.

Third Compound Having an Ethylenically Unsaturated Group and an Oxirane Group

The third compound included in the reaction mixture to form the reactive primer compound contains an ethylenically unsaturated group plus an oxirane group. Although the third compound can include more than one ethylenically unsaturated group and/or more than one oxirane group, most second compounds contain only one of each type of group. The ethylenically unsaturated group, which has an ene group, can react with a thiol group in the first compound.

The third compound is a heterohydrocarbon compound and optionally contains heteroatoms in addition to those included in the diketone and oxirane group. These other groups can be an oxy group, imino group, carbonyloxy group, carbonylimino, oxy-alkylene group, oxy-alkylene-oxy group, alkylene-oxy-alkylene group, heterocyclic ring, or the like and combinations thereof. The third compound can be either aliphatic or aromatic. The molecular weight (weight average molecular weight) of the second compound is often no greater than 1000, no greater than 900, no greater than 800, no greater than 600, no greater than 500, no greater than 400, or no greater than 300 grams/mole but higher molecular weight second compound can be used, if desired.

Some example third compounds include allylglyicidyl ether

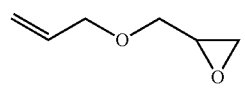

or compounds of Formula (VII)

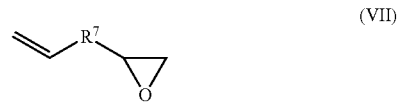

(VII)

where $R^7$ is an alkylene having 2 to 10 carbon atoms. Example compounds of Formula (VII) include 1,2-epoxy-7-octene, 1,2-epoxy-5-hexene, and 1,2-epoxy-9-decene.

Other example third compounds include those of Formula (VIII).

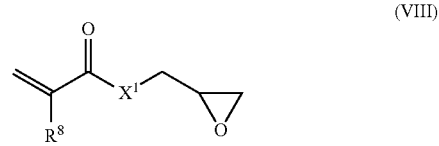

(VIII)

In Formula (VIII), group $R^8$ is hydrogen or methyl and group $X^1$ is oxy or —NH—. Example compounds of Formula (VIII) include glycidyl (meth)acrylate and N,N-bis(oxiran-2-lymethyl)prop-2-enamide.

Still other third compounds are of Formula (IX).

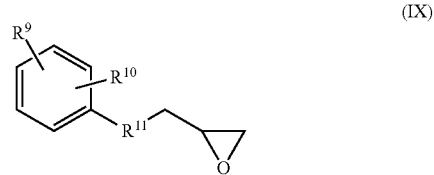

(IX)

In Formula (IX), $R^9$ is an optional alkoxy group. Group $R^{10}$ is vinyl, allyl, or allyloxy and group $R^{11}$ is oxy or —CH$_2$—O—. Example compounds of Formula (IX) include 2-[(2-allylphenoxy)methyl]oxirane, 2-[(4-allyl-2-methoxyphenoxy)methyl]oxirane, 2-(4-ethenylphenoxymethyl)oxirane, 2-(2-allyloxy-phenoxymethyl)-oxirane, 2-(4-allyloxy-phenoxymethyl)-oxirane, and 2-((4-vinylbenzyloxy)methyl) oxirane.

Preparation of Reactive Primer Compound

Any suitable method can be used to form the reactive primer compound. In some embodiments, the three compounds are combined in amounts sufficient to react at least one mole of the second compound and at least one mole of the third compound with every mole of the first compound.

An optional organic solvent that is miscible with all three compounds plus the reactive primer compound can be present. The organic solvent is typically selected so that it does not react with any of the three compounds used to form the reactive primer compound. Further, the organic solvent is usually selected to have a boiling point that is no greater than 120 degrees Celsius such as no greater than 110 degrees Celsius or no greater than 100 degrees Celsius. Suitable solvents include, but are not limited to, ethyl acetate, acetone, tetrahydrofuran, methyl ethyl ketone, methyl isobutyl ketone, acetonitrile, butanol, isopropanol, benzene, toluene, or a combination thereof. In some embodiments, the reaction mixture contains 0 to 60 weight percent of the optional organic solvent.

In addition to the first compound, the second compound, and the third compound, the reaction mixture often contains an initiator that is a photoinitiator active in the UV-visible region of the electromagnetic spectrum or a thermal initiator. The initiator is often added in an amount in a range of 0 to 5 weight percent based on the total weight of the reactants (i.e., the first, second, and third compounds). The amount is often at least 0.1, at least 0.5, at least 1, at least 1.5, at least 2, at least 2.5 and up to 5, up to 4.5, up to 4, up to 3.5, up to 3, up to 2.5, or up to 2 weight percent based on the total weight of the reactants.

Exemplary thermal initiators include various azo compound such as those commercially available under the trade designation VAZO from Chemours Co. (Wilmington, DE, USA) including VAZO 67, which is 2,2"-azobis(2-methylbutane nitrile), VAZO 64, which is 2,2'-azobis(isobutyronitrile), VAZO 52, which is (2,2"-azobis(2,4-dimethylpentanenitrile), and VAZO 88, which is 1,1'-azobis (cyclohexanecarbonitrile): various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, PA, USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne): various hydroperoxides such as tert-amyl hydroperoxide and tert-butyl hydroperoxide; and mixtures thereof.

In many embodiments, a photoinitiator is used to form the reactive primer compound. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, NJ, USA) or under the trade designation ESACURE KB-1 from Sartomer (Exton, PA, USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, NY, USA)).

The thiol-ene reaction of the first compound with both the second and third compounds can occur under any known reaction conditions. In some embodiments, the reaction occurs at or near room temperature (e.g., in a range of 20 to 30 degree Celsius) in the presence of ultraviolet radiation. Black ultraviolet light sources that emit long wavelength (UV-A) ultraviolet light and very little visible light are often preferred. In other embodiments, the reaction occurs at elevated temperatures (e.g., up to 60 degrees Celsius, up to 50 degrees Celsius, or up to 40 degrees Celsius). The reaction time is typically less than 10 hours, less than 8 hours, less than 5 hours, or less than 2 hours.

Articles

Various types of articles of increasing complexity are provided. The most basic article, which can be referred to as a "first article", contains a first metal-containing substrate and a first surface of a first primer layer positioned adjacent to the first metal-containing substrate. That is, the first article is arranged in the following order: (1) first metal-containing substrate and (2) first primer layer. The first primer layer comprises a first reactive primer compound as described above. The first reactive primer compound is chelated to the first metal-containing substrate.

Other articles further contain a curable composition. These articles can be referred to as a "second article". The curable composition is positioned adjacent to a second surface of the first primer layer opposite the first surface of the first primer layer. That is, the second article is arranged in the following order: (1) first metal-containing substrate, (2) first primer layer, and (3) curable composition. The curable composition contains an epoxy resin and a curative for the epoxy resin.

Still other articles further contain both a second primer layer adjacent to the curable composition opposite the first primer layer and a second metal-containing substrate positioned adjacent to the second primer layer opposite the curable composition. These articles can be referred to as "third articles". The third article is arranged in the following order: (1) first metal-containing substrate, (2) first primer layer, (3) curable composition, (4) second primer layer, and (5) second metal-containing substrate. The second primer layer contains a second reactive primer compound such as any those described above. The second reactive primer compound is chelated to the second metal-containing substrate.

The curable composition in either the second article or the third article can be cured. The cured composition can be bonded to the first primer layer in the cured second article or to both the first primer layer and to the second primer layer in the cured third article.

Starting with the first articles, these articles contain a primer layer positioned adjacent to a metal-containing substrate. The primer layer is formed on the metal-containing substrate using a primer composition that includes both the reactive primer compound and an organic solvent. The organic solvent is typically selected to be easily removed after deposition of the primer composition on the metal-containing substrate. Most of the organic solvent is removed by drying (e.g., evaporation or heating) to form the primer layer.

Any suitable metal-containing substrate can be used. For example, the substrate can contain metals, metal oxides, metal alloys, metal-containing ceramic materials, or mixture thereof. In some embodiments, the first article contains a steel-containing substrate, a copper-containing substrate, an iron-containing substrate, a zinc-containing substrate, a chromium-containing substrate, a nickel-containing substrate, a zirconium-containing substrate, or a combination thereof. For example, the steel-containing substrate can be stainless steel or galvanized steel and the copper-containing substrate can be copper, bronze, or brass. In some embodiments, the substrate contained a galvanized metal such as galvanized steel.

The primer layer is typically formed on the metal-containing substrate with a primer composition. The primer composition contains various materials dissolved in an organic solvent such that the solid content is in a range of about 1 to about 20 weight percent based on a total weight of the primer composition. The solids typically include the reactive primer compound and other optional compounds such as, for example, a fluorescent compound or dye (e.g., an ultraviolet or visible dye). The fluorescent compound or dye can provide a means of verifying that the primer layer has been applied to the metal-containing substrate. The percent solids can be at least 1, at least 2, at least 3, or at least 5 weight percent and up to 20, up to 18, up to 15, up to 12, up to 10, up to 8, up to 7, or up to 5 weight percent based on a total weight of the primer composition. Typically, at least 80 weight percent of the solid content is the reactive primer compound. For example, at least 85, at least 90, at least 95, at least 98, or at least 99, at least 99.5, or 100 weight percent of the solid content of the primer composition is the reactive primer compound. The remainder of the primer composition (i.e., the portion of the primer composition that is not a solid) is typically an organic solvent selected, for example, from those organic solvents described above for use in preparation of the reactive primer compound.

Any suitable method can be used to position the first primer composition adjacent to a first surface of a metal-containing substrate. For example, the primer composition can be applied using a sponge, roller, swab, or the like. Alternatively, the primer composition can be applied to the substrate by dip coating or by spraying. In most embodiments, the primer composition is applied to completely cover the first surface of the metal-containing substrate. The second primer composition in the third article can be positioned adjacent to the second metal-containing substrate in the same manner.

After application, the first primer composition is dried to form the first primer layer. Any suitable drying method can be used such as evaporation at room temperature or heating at a temperature above room temperature that is sufficient to volatilize the organic solvent within a desired amount of time. The temperature is often no greater than about 100, no greater than 80, no greater than 60, no greater than 50, or no greater than 40 degrees Celsius. No special atmosphere is needed. The second primer layer in the third article can be formed adjacent to the second substrate in the same manner.

Although any suitable thickness can be used, the thickness of the first primer layer on the first metal-containing substate is often no greater than 100, no greater than 90, no greater than 80, no greater than 70, no greater than 60, or no greater than 50 micrometers. The thickness is sufficient to completely cover at least one surface of the metal-containing substrate. The thickness of the second primer layer on the second metal-containing substrate in the third article is like that of the first primer layer in the first article.

Second articles can be prepared from the first articles. More specifically, second articles are provided that contain (1) a first metal-containing substrate, (2) a first primer layer comprising a first reactive primer compound, and (3) a curable composition. To form the second article, a first surface of the first primer layer is positioned adjacent the first metal-containing substrate. A curable composition is positioned adjacent to a second surface of the first primer layer opposite the first surface of the first primer layer. The curable composition typically contains an epoxy resin and a curative for the epoxy resin. The curative is often a compound having multiple amino, thiol, hydroxy, carboxylic acid, anhydride groups, or mixtures thereof. In many embodiments, the curative has multiple amino (primary and/or secondary amino groups). The curable composition is usually a precursor of a cured coating layer or to a cured adhesive composition. The cured adhesive composition is often a structural adhesive or semi-structural adhesive. In the second article, the first reactive primer compound within the first primer layer can chelate with the first metal-containing substrate through the acetoacetate group.

The cured second article contains the first metal-containing substrate, a first primer layer containing a reacted first primer compound, and a cured composition. The first primer layer is chelated to the first metal-containing substrate through the acetoacetate groups of the first reacted primer layer. The epoxy groups of the reacted first primer compound typically has reacted to form a covalent bond with components of the cured composition. The formation of the covalent bond results in the incorporation of a first reacted primer compound into the polymeric matrix of the cured composition. Thus, the first primer layer is attached to the first metal-containing substrate through chelation and to the cured composition through a covalent bond.

A third article is provided that includes the second article plus an additional primer layer and an additional metal-containing substrate. More specifically, the third article contains (1) a first metal-containing substrate. (2) a first primer layer comprising a first reactive primer compound. (3) a curable composition. (4) a second primer layer comprising a second reactive primer compound, and (5) a second metal-containing substrate. To form the third article, a first surface of the first primer layer is positioned adjacent the first metal-containing substrate. A first surface of a curable composition is positioned adjacent to a second surface of the first primer layer opposite the first surface of the first primer layer. The curable composition typically contains an epoxy resin and a curative for the epoxy resin. The curative is often a compound having multiple amino, thiol, hydroxy, carboxylic acid, anhydride groups, or mixtures thereof. In many embodiments, the curative has multiple amino (primary and/or secondary amino groups). The curable composition is usually a precursor of a cured adhesive composition. The cured adhesive composition is often a structural adhesive or semi-structural adhesive. A first surface of a second primer composition is positioned adjacent to a second surface of the curable composition opposite the first surface of the curable composition. The second primer composition contains a second reactive primer compound that can be the same or different than the first reactive primer compound. Both primer compounds are those described above. A second metal-containing substrate is positioned adjacent to a second surface of the second primer layer opposite the first surface of the second primer layer. In the third article, the first primer compound in the first primer layer can chelate with the first metal-containing substrate and the second primer compound in the second primer layer can chelate with the second metal-containing substrate in the second primer layer.

The cured third article contains in the following order the first metal-containing substrate, a first primer layer containing a reacted first primer compound, a cured composition, a second primer layer containing a reacted second primer compound, and a second metal-containing substrate. The first primer layer is chelated to the first metal-containing substrate through the acetoacetate groups of the first reacted primer layer. Likewise, the second primer layer is chelated to the second metal-containing substrate through the acetoacetate groups of the second reacted primer layer. The epoxy groups of both the reacted first primer compound and the reacted second primer compound typically have reacted to form covalent bonds with components of the cured composition. The formation of the covalent bonds result in the incorporation of a first reacted primer compound and the second reacted primer compound into the polymeric matrix of the cured composition. Thus, the first primer layer is attached to the first metal-containing substrate through chelation and to the cured composition through a covalent bond. Further, the second primer layer is attached to the second metal-containing substrate through chelation and to the cured composition through a covalent bond.

Curable Composition

The curable composition comprises an epoxy resin and a curative for the epoxy resin, with the curative usually being an amine curative with a plurality of amino groups (i.e., primary and/or secondary amino groups) but other curatives such as those having a plurality of thiol, hydroxy, carboxylic acid, or anhydride group, and combinations thereof also can be used. The curable composition, which is described further below, is positioned adjacent to at least a first primer layer and optionally between the first primer layer and a second primer layer. The cured composition can be either an adhesive layer (e.g., a structural or semi-structural adhesive) or a coating layer. If the cured composition is a coating, the first primer layer is positioned between the first metal-containing substrate and the curable composition. If the cured composition is an adhesive, the curable composition is typically positioned between the first primer layer and the second primer layer. The first primer layer is positioned between the curable composition and the first metal-containing substrate and the second primer layer is positioned between the curable composition and the second metal-containing substrate.

If the curable composition is not intended to be used immediately after preparation, the curable composition is typically prepared as a multi-part (e.g., two-part) composition. The materials in each part are selected so that there is no condensation or curing reactions within that part. The second part usually includes an epoxy resin, and the first part includes a curing agent, which is usually an amine curative, for the epoxy resin in the first part.

The epoxy resin typically has at least two glycidyl groups. Suitable epoxy resins may include aromatic polyepoxide resins (e.g., a chain-extended diepoxide or novolac epoxy resin having at least two epoxide groups), aromatic monomeric diepoxides, aliphatic polyepoxide, or aliphatic monomeric diepoxides. The aromatic polyepoxide or aromatic monomeric diepoxide typically contains at least one (e.g., in a range of 1 to 6, 1 to 4, 2 to 6, or 2 to 4) aromatic ring that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For epoxy resins containing two or more aromatic rings, the rings may be connected, for example, by a branched or straight-chain alkylene group having 1 to 4 carbon atoms that may optionally be substituted by halogen (e.g., fluoro, chloro, bromo, iodo).

Examples of aromatic epoxy resins may include novolac epoxy resins (e.g., phenol novolacs, ortho-, meta-, or epoxy resin para-cresol novolacs, or combinations thereof), bisphenol epoxy resins (e.g., bisphenol A, bisphenol F, halogenated bisphenol epoxies, and combinations thereof), resorcinol epoxy resins, tetrakis phenylolethane epoxy resins, and combinations of any of these. Useful epoxy compounds include diglycidyl ethers of difunctional phenolic compounds (e.g., p,p'-dihydroxydibenzyl, p,p'-dihydroxydiphenyl, p,p'-dihydroxyphenyl sulfone, p,p'-dihydroxy benzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane). In some embodiments, the epoxy resin includes a bisphenol diglycidyl ether, wherein the bisphenol (i.e., —O—$C_6H_5$—$CH_2$—$C_6H_5$—O— group) may be unsubstituted (e.g., bisphenol F), or wherein either of the phenyl rings or the methylene group may be substituted by one or more halogens (e.g., fluoro, chloro, bromo, iodo), methyl groups, trifluoromethyl groups, or hydroxymethyl groups.

Examples of aromatic monomeric diepoxides useful in the curable component as the epoxy resin include, but are not limited to, the diglycidyl ether of bisphenol A, the diglycidyl ether of bisphenol F, and mixtures thereof. Bisphenol epoxy resins, for example, may be chain extended to have any desirable epoxy equivalent weight. Chain extending epoxy resins can be carried out by reacting a monomeric diepoxide, for example, with a bisphenol in the presence of a catalyst to make a linear polymer.

The aromatic epoxy resin (e.g., either a bisphenol epoxy resin or a novolac epoxy resin) often has an epoxy equivalent weight of at least 150, 170, 200, or 225 grams per equivalent. The epoxy equivalent weight can be up to 2000, 1500, or 1000 grams per equivalent. In some embodiments, the aromatic epoxy resin may have an epoxy equivalent weight in a range of 150 to 2000, 150 to 1000, or 170 to 900 grams per equivalent. For example, the epoxy resin can have an epoxy equivalent weight in a range of 150 to 450, 150 to 350, or 150 to 300 grams per equivalent. Epoxy equivalent weights may be selected, for example, so that the epoxy resin may be used as a liquid or solid, as desired.

In some embodiments, in addition or as an alternative to aromatic epoxy resins, the epoxy resins may include one or more non-aromatic epoxy resins. In some cases, non-aromatic (i.e., aliphatic) epoxy resins can be useful as reactive diluents that may help control the flow characteristics of the compositions. Non-aromatic epoxy resins useful in the curable compositions include, for example, a branched or straight-chain alkylene group having 1 to 20 carbon atoms optionally interrupted with at least one —O— and optionally substituted by hydroxyl. In some embodiments, the non-aromatic epoxy can include a poly(oxyalkylene) group having a plurality (q) of oxyalkylene groups, —$OR^{20}$—, wherein each $R^{20}$ is independently an alkylene having 2 to 5 carbon atoms. In some embodiments. $R^{20}$ is an alkylene with 2 to 4 carbon atoms, q is 2 to about 6 (or even higher), 2 to 5, 2 to 4, or 2 to 3. To become crosslinked into a network, useful non-aromatic epoxy resins will typically have at least two epoxy end groups.

Examples of useful non-aromatic epoxy resins include glycidyl epoxy resins such as those based on diglycidyl ether compounds comprising one or more oxyalkylene units. Examples of these epoxy resins include ethylene glycol diglycidyl ether, propylene glycol diglycidyl ether, diethylene glycol diglycidyl ether, dipropylene glycol diglycidyl ether, polyethylene glycol diglycidyl ether, polypropylene glycol diglycidyl ether, glycerol diglycidyl ether, glycerol triglycidyl ether, propanediol diglycidyl ether, butanediol diglycidyl ether, and hexanediol diglycidyl ether. Other useful non-aromatic epoxy resins include a diglycidyl ether of cyclohexane dimethanol, a diglycidyl ether of neopentyl glycol, a triglycidyl ether of trimethylolpropane, and a diglycidyl ether of 1,4-butanediol.

In some embodiments, the epoxy resins may be liquid at room temperature. Several suitable epoxy resins are commercially available. For example, several epoxy resins of various classes and epoxy equivalent weights are available from Dow Chemical Company (Midland, MI, USA), Hexion, Inc. (Columbus, OH, USA), Huntsman Advanced Materials (The Woodlands, TX, USA), CVC Specialty Chemicals Inc. (Akron, OH, USA and recently acquired by Emerald Performance Materials), and Nan Ya Plastics Corporation (Taipei City, Taiwan). Examples of commercially available glycidyl ethers include diglycidyl ethers of bisphenol A (e.g., those available under the trade designations "EPON" from Hexion Inc. (Columbus, OH, USA) (e.g., EPON 828, EPON 1001, EPON 1310, and EPON 1510), those available under the trade designation "D.E.R." from Dow Chemical Co. (e.g., D.E.R. 331, 332, and 334), those available under the trade designation "EPICLON" from Dainippon Ink and Chemicals, Inc. (e.g., EPICLON 840 and 850), and those available under the trade designation "YL-980" from Japan Epoxy Resins Co., Ltd.)): diglycidyl ethers of bisphenol F (e.g., those available under the trade designation "EPICLON" from Dainippon Ink and Chemicals, Inc. (e.g., EPICLON 830)): polyglycidyl ethers of novolac resins (e.g., novolac epoxy resins, such as those available under the trade designation "D.E.N." from Dow Chemical Co. (e.g., D.E.N. 425, 431, and 438)); and flame retardant epoxy resins (e.g., D.E.R. 580, a brominated bisphenol type epoxy resin available from Dow Chemical Co.). Examples of commercially available non-aromatic epoxy resins include the diglycidyl ether of cyclohexane dimethanol, available from Hexion Inc. (Columbus OH, USA) under the trade designation HELOXY MODIFIER 107.

While any suitable amount of the epoxy resin can be included in the curable composition, the amount is often in a range of 40 to 80 weight percent based on a total weight of the curable components. The amount is often at least 40 weight percent, at least 45 weight percent, at least 50 weight percent, at least 55 weight percent, at least 60 weight percent, at least 65 weight percent and can be up to 80 weight percent, up to 75 weight percent, up to 70 weight percent, up to 65 weight percent, or up to 60 weight percent.

While the curing agent can have a plurality of any group that can react with an epoxy group (e.g., thiol, hydroxy, carboxylic acid, or anhydride group, and combinations thereof), the curing agent is typically a nitrogen-containing compound having at least two primary and/or secondary amino groups. That is, the curing agent is an amine curative having at least two reactive amine hydrogen (—NH) groups. The primary and/or secondary amino groups are of formula —NHR$^{21}$ where R$^{21}$ is hydrogen, alkyl, aryl, aralkyl, or alkaryl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atoms such as a phenyl or biphenyl group. Suitable aralkyl groups often have an alkylene portion having 1 to 10 carbon atoms, 1 to 6 carbon atoms, or 1 to 4 carbon atoms and an aryl portion having 6 to 20 carbon atoms, 6 to 12 carbon atoms, or 6 to 10 carbon atoms. An example aralkyl is benzyl. Suitable alkaryl groups often have an arylene portion having 6 to 20 carbon atoms, 6 to 18 carbon atoms, 6 to 16 carbon atoms, 6 to 12 carbon atoms, or 6 to 10 carbon atoms and an alkyl portion having 1 to 10 carbon atoms, 1 to 6 carbon atoms, or 1 to 4 carbon atoms. An example alkaryl is a tolyl group. In most embodiments, R$^{21}$ is hydrogen or alkyl.

The primary and/or secondary amino groups of the curing agent react with the epoxide groups of the epoxy resin. This reaction opens the epoxide groups and covalently bonds the curing agent to the epoxy resin. The reaction results in the formation of divalent groups of formula —OCH$_2$—CH$_2$—NR$^{21}$— where R$^{21}$ is the same as defined above.

The curing agent minus the at least two amino groups (i.e., the portion of the curing agent that is not an amino group) can be any suitable aromatic group, aliphatic group, or combination thereof. Some amine curing agents are of Formula (X) with the additional limitation that there are at least two primary amino groups, at least two secondary amino groups, or at least one primary amino group and at least one secondary amino group.

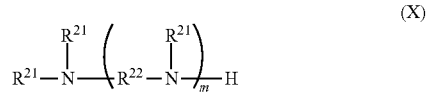

(X)

Each R$^{21}$ group is independently hydrogen, alkyl, aryl, aralkyl, or alkaryl as defined above provided there is at least two primary and/or secondary amino groups. Each R$^{22}$ is independently an alkylene, heteroalkylene, or combination thereof. Suitable alkylene groups often have 1 to 20 carbon atoms, 1 to 16 carbon atoms, 1 to 10 carbon atoms, 1 to 6 carbon atoms, or 1 to 4 carbon atoms. Suitable heteroalkylene groups have at least one oxy, thio, or —NH— group positioned between two alkylene groups. Suitable heteroalkylene groups often have 2 to 50 carbon atoms, 2 to 40 carbon atoms, 2 to 30 carbon atoms, 2 to 20 carbon atoms, or 2 to 10 carbon atoms and up to 20 heteroatoms, up to 16 heteroatoms, up to 12 heteroatoms, or up to 10 heteroatoms. The heteroatoms are often oxy groups. The variable m is an integer equal to at least one and can be up to 10 or higher, up to 5, up to 4, or up to 3.

Some amine curing agents can have an R$^{22}$ group selected from an alkylene group. Examples include, but are not limited to, ethylene diamine, diethylene triamine, triethylene tetramine, propylene diamine, dipropylene triamine, tetraethylene pentamine, hexaethylene heptamine, hexamethylene diamine, 2-methyl-1,5-pentamethylene diamine, 1-amino-3-aminomethyl-3,3,5-trimethylcyclohexane (also called isophorene diamine), 1,3 bis-aminomethyl cyclohexane, 1,10-dimainodecane, 1,12-diaminododecene, and the like.

Other amine curing agents can have an R$^{22}$ group selected from a heteroalkylene group such as a heteroalkylene having oxygen heteroatoms. For example, the curing agent can be a compound such as aminoethylpiperazine, 4,7,10-trioxatridecane-1,13-diamine (TOTDDA) (which is available from TCI America in Portland, OR, USA), or a poly(alkylene oxide) diamine (also called polyether diamines) such as a poly(ethylene oxide) diamine, poly(propylene oxide) diamine, or a copolymer thereof. Polyether diamines are commercially available under the trade designation JEFFAMINE from Huntsman Corporation in The Woodlands, TX, USA.

Still other amine curing agents can be formed by reacting a polyamine (i.e., a polyamine refers to an amine with at least two amino groups selected from primary amino groups and/or secondary amino groups) with another reactant such as an epoxy resin to form an amino-containing adduct (e.g., polyamine adduct) having at least two amino groups that are primary and/or secondary amino groups. The polyamine can be of Formula (X). For example, a polyamine of Formula (X) can be reacted with a diglycidyl epoxide to form an adduct having at least two amino groups.

In some embodiments of forming the adduct, a diamine can first be reacted with a dicarboxylic acid in a molar ratio of diamine to dicarboxylic acid that is greater than or equal to 2:1 to form a polyamidoamine having two terminal amino groups. Such a polyamidoamine can be prepared as described, for example, in U.S. Pat. No. 5,629,380 (Baldwin et al.). The polyamidoamine can be reacted as the polyamine with an epoxy resin to form the amino containing adduct.

When the polyamine is a diamine and it is reacted with an epoxy resin having two glycidyl groups in a molar ratio of diamine to epoxy resin greater than or equal to 2:1, a polyamine adduct having two amino groups can be formed. This product is often a polymeric material. A molar excess of the diamine (which can be polymeric, if desired) is often used so that the curing agent includes both the amine-containing adduct plus free (non-reacted) diamine (which can be polymeric, if desired). For example, the molar ratio of diamine to epoxy resin with two glycidyl groups can be greater than 2.5:1, greater than 3:1, greater than 3.5:1, or greater than 4:1.

The curing agent can also be one or more aromatic rings substituted with multiple amino groups or with amino-containing groups. Such curing agents include, but are not limited to, xylene diamines (e.g., meta-xylene diamine) or similar compounds. For example, one such curing agent is commercially available under the trade designation ANCAMINE (e.g., ANCAMINE 2609) from Air Products and Chemicals, Inc. (Allentown, PA, USA) and under the trade designation ARADUR 2965 from Huntsman Corporation (The Woodlands, TX, USA). This curing agent is based on meta-xylene diamine. Another example curing agent is 4,4-diaminodiphenyl sulfone (DDS), which is commercially available as ARADUR 9964-1 from Huntsman Corporation.

Still other curing agents include hydrazine, hydrazide or derivatives thereof (e.g., aminodihydrazide, adipic dihydrazide, and isophthalyl dihydrazide), guanidines or derivatives thereof, and dicyanamide (DICY) or derivatives thereof.

The amount of the curing agent is dependent on its molecular weight and often contains a mixture of different curing agents such as a mixture of different curing agents selected from non-polymeric curing agents, polymeric curing agent, and polyamine adducts. Further, the amount of the curing agent is also dependent on the number of amino groups (reactive amine hydrogen groups) per mole of the curing agent. Overall, the amount of the curing agent is often in a range of 10 to 60 weight percent based on a total weight of the curable component. For example, the amount can be at least 10 weight percent, at least 15 weight percent, at least 20 weight percent, at least 25 weight percent, at least 30 weight percent, at least 35 weight percent, or at least 40 weight percent and up to 60 weight percent, up to 55 weight percent, up to 50 weight percent, up to 45 weight percent, up to 40 weight percent, up to 35 weight percent, or up to 30 weight percent.

In addition to a curing agent such as those described above, the curable component can further include a curing catalyst. These curing catalyst compounds can be accelerators for self-polymerization of the epoxy resin or for reaction of the epoxy resin with the curing agent.

Some curing catalysts are phenols substituted with tertiary amino groups and can be of Formula (XI).

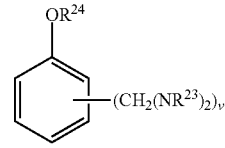

(XI)

In Formula (XI), each group $R^{23}$ is independently an alkyl. The variable v is an integer equal to 2 or 3. Group $R^{24}$ is hydrogen or alkyl. Suitable alkyl groups for $R^{23}$ and $R^{24}$ often have 1 to 12 carbon atoms, 1 to 8 carbon atoms, 1 to 6 carbon atoms, or 1 to 4 carbon atoms. One exemplary secondary curative of Formula (XI) is tris-2,4,6-(dimethylaminomethyl)phenol (i.e., tris(dimethylaminomethyl)phenol) that is commercially available under the trade designation ANCAMINE K54 from Air Products and Chemicals, Inc. (Allentown, PA, USA) and under the trade designation VERSAMID EH 30 from Gabriel Performance Products (Akron, OH, USA).

Another class of curing catalyst is substituted ureas such as, for example, a bis-substituted urea. Examples include, but are not limited to, 4,4'-methylene bis(phenyl dimethyl) urea, toluene diisocyanate urea, 3-(4-chlorophenyl)-1,1-dimethylurea, and various compounds that are commercially available from CVC Thermoset Specialties under the trade designation OMICRON (e.g., OMICURE U-35 (which is a cycloaliphatic bisurea), U-52, and U-52M).

Yet another class of curing catalyst is various sulfonic acidic compounds and salts thereof, such as those commercially available under the trade designation NACURE from King Industries, Inc. (Norwalk, CT, USA).

Still other curing catalysts are imidazole compounds or salts thereof or imidazolines or salts thereof. A first type of these compounds can react with an epoxy resin at room temperature. A second type of these compounds can react with the epoxy resin after being heated above their melting point (e.g., above 150° C., above 170° C., or above 200° C.). The second type of compounds can be referred to as "latent curatives" or "blocked curatives."

The first type of imidazole compounds (i.e., those that can react below their melting point) are often substituted at the 1-position or the 2-position of the imidazole ring. In epoxy systems, this type of imidazole compound can be used as accelerators or catalysts for other curing agents and can also act as curing catalysts for epoxy resins. Examples of those used as catalysts or accelerators include: 2-methyl-imidazole, 2-ethyl-4-methyl imidazole, 2-phenyl imidazole, 2-phenyl-4-methyl imidazole, 1,2-dimethylimidazole, 2-heptadecyl imidazole, 1-benzyl-2-methyl imidazole, 1-benzyl-2-phenyl-imidazole, and 2-phenyl-4,5-dihydroxymethyl imidazole (commercially available from Air Products and Chemicals Inc., under the trade designation CUREZOL 2PZ-S).

The second type of imidazole compounds (i.e., those that can react above their melting point) are commercially available from Air Products and Chemicals Inc., under the trade designation CUREZOL 2MA-AZINE (which is 2,4-diamino-6(2"-methylimidazoleyl-(1'))ethyl-s-triazine), and CUREZOL 2MA-OK (which is 2,4-diamino-6(2"-methylimidazolyl-(1')(ethyl-s-triazine isocyanurate adduct))), and under the trade designation ARADUR 3123, which is 1-((2-methyl-1H-imidazol-1-yl)methyl)naphthalen-2-ol from Huntsman Corporation. Other imidazole compounds are metal imidazole salts such as those described in U.S. Pat. No. 4,948,449 (Tarbutton et al.).

The amount of the curing catalyst can be in a range of 0 to 10 weight percent based on a total weight of the curable component. If present, the amount is often at least 0.1 weight percent, at least 0.2 weight percent, at least 0.5 weight percent, at least 1 weight percent, or at least 2 weight percent and up to 10 weight percent, up to 8 weight percent, up to 6 weight percent, up to 5 weight percent, or up to 4 weight percent.

The curable composition may also include one or more optional toughening agents. Such toughening agents may be useful, for example, for improving the properties (e.g., peel strength) of some cured compositions so that they are less likely to undergo brittle failure in a fracture. The toughening agent (e.g., an elastomeric resin or elastomeric filler) may or may not be covalently bonded within the final crosslinked network of the cured composition. In some embodiments, the toughening agent may include an epoxy-terminated compound, which can be incorporated into the polymeric backbone.

Examples of useful toughening agents, which may also be referred to as elastomeric modifiers, include polymeric compounds having both a rubbery phase and a thermoplastic phase such as graft copolymers having a polymerized diene rubbery core and a polyacrylate or polymethacry late shell: graft copolymers having a rubbery core with a polyacrylate or polymethacrylate shell: elastomeric particles polymerized in situ in the epoxide from free-radical polymerizable monomers and a copolymeric stabilizer; elastomer molecules such as polyurethanes and thermoplastic elastomers: separate elastomer precursor molecules: combination molecules that include epoxy-resin segments and elastomeric segments; and, mixtures of such separate and combination molecules. The combination molecules may be prepared by reacting epoxy resin materials with elastomeric segments: the reaction can leave reactive functional groups, such as unreacted epoxy groups, on the reaction product. The use of toughening agents in epoxy resins is described in the Advances in Chemistry Series No. 208, entitled "Rubbery-Modified Thermoset Resins", edited by C. K. Riew and J. K. Gillham, American Chemical Society, Washington, 1984. The amount of toughening agent to be used depends, in part, upon the final physical characteristics of the cured resin desired.

The optional toughening agents included in the curable component often contain graft copolymers having a polymerized diene rubbery backbone or core to which is grafted a shell of an acrylic acid ester or methacrylic acid ester, mono-vinyl aromatic hydrocarbon, or a mixture thereof, such as those disclosed in U.S. Pat. No. 3,496,250 (Czerwinski). Rubbery backbones can comprise polymerized butadiene or a polymerized mixture of butadiene and styrene. Shells comprising polymerized methacrylic acid esters can be lower alkyl ($C_{1-4}$) methacrylates. Mono-vinyl aromatic hydrocarbons can be styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature ($T_g$) below about 0° C., such as poly(butyl acrylate) or poly(isooctyl acrylate), to which is grafted a polymethacrylate polymer shell having a $T_g$ of about 25° C. such as poly(methyl methacrylate). For acrylic core/shell materials, the term "core" will be understood to be an acrylic polymer having a $T_g$ less than 0° C. and the term "shell" will be understood to be an acrylic polymer having a $T_g$ greater than 25° C. Some core/shell toughening agents (e.g., including acrylic core/shell materials and methacrylate-butadiene-styrene (MBS) copolymers wherein the core is cross-linked styrene/butadiene rubber and the shell is polymethylacrylate) are commercially available, for example, from Dow Chemical Company under the trade designation "PARALOID".

Another useful core-shell rubber is described in U.S. Pat. Appl. Publ. No. 2007/0027233 (Yamaguchi et al.). Core-shell rubber particles as described in this document include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber can be dispersed in a polymer or an epoxy resin. Examples of useful core-shell rubbers include those sold by Kaneka Corporation under the designation Kancka KANE ACE, including the Kancka KANE ACE 15 and 120 series of products (e.g., KANE ACE MX-153, KANE ACE MX-154, KANE ACE MX-156, KANE ACE MX-257, and KANE ACE MX-120) core-shell rubber dispersions, and mixtures thereof. The products contain the core-shell rubber (CSR) particles pre-dispersed in an epoxy resin, at various concentrations. For example, KANE ACE MX-153 core-shell rubber dispersion contains 33 weight percent CSR, KANE ACE MX-154 core-shell rubber dispersion contains 40 weight percent CSR, and KANE ACE MX-156 core-shell rubber dispersions contain 25 weight percent CSR.

Other useful toughening agents include carboxyl-terminated and amine-terminated acrylonitrile/butadiene elastomers such as those obtained from Emerald Performance Materials (Akron, OH, USA) under the trade designation HYPRO (e.g., CTB and ATBN grades such as HYPRO 1300X42 ATBN): carboxyl- and amine-terminated butadiene polymers such as those obtained from Emerald Performance Materials under the trade designation HYPRO (e.g., CTB grade): amine-functional polyethers such as any of those described above; and amine-functional polyurethanes such as those described in U.S. Pat. Appl. No. 2013/0037213 (Frick et al.). These polymers have more than 20 carbon atoms and are not considered to be multifunctional amine compounds as defined herein.

Still other useful toughening agents are phenalkamines with more than 20 carbon atoms such as, for example, phenalkamines commercially available under the trade designation CARDOLITE (e.g., CARDOLITE NC-540). CARDOLITE NC-540 is a product of a Mannich reaction of cashew nutshell liquid, formaldehyde, and certain amines. The cashew nutshell liquid contains cardanol, a phenolic material having an attached $C_{13}H_{27}$ group.

In some embodiments, the toughening agent may include an acrylic core/shell polymer: a styrene-butadiene/methacrylate core/shell polymer: a polyether polymer: a carboxyl- or amino-terminated acrylonitrile/butadiene: a carboxylated butadiene, a polyurethane, or a combination thereof.

The toughening agent can be present in an amount in a range of 0 to 40 weight percent based on the total weight of the curable component. If present, the toughening agent is often present in an amount equal to at least 1 weight percent, at least 2 weight percent, at least 5 weight percent, at least 10 weight percent, at least 15 weight percent, or at least 20 weight percent, and up to 40 weight percent, up to 35 weight percent, up to 30 weight percent, up to 25 weight percent, or up to 20 weight percent.

Further additives can be included in the curable component. For example, additives such as antioxidants/stabilizers, colorants, thermal degradation stabilizers, light stabilizers, tackifiers, flow agents, bodying agents, flatting agents, blowing agents, fungicides, bactericides, surfactants, plasticizers, organic fillers, pigments, flame retardants, dispersants, and other additives known to those skilled in the art can be added. These additives, if present, are added in an amount effective for their intended purpose.

Suitable organic fillers include, for example, carbon block, coal tar, polymeric fibers, carbon fibers, polymeric beads, and the like.

In some embodiments, the curable component may include dispersants that can help stabilize any optional inorganic or organic filler that is in the curable composition. That is, without dispersant, the filler may aggregate, thus adversely affecting the benefit of the inorganic filler in the cured composition. Suitable dispersants may depend on the specific identity and surface chemistry of the filler. In some embodiments, suitable dispersants may include at least a binding group and a compatibilizing segment. The binding group may be ionically bonded to the surface of the filler. Examples of binding groups for inorganic fillers (e.g., metal oxide fillers) include phosphoric acid, phosphonic acid, sulfonic acid, carboxylic acid, and amine. The compatibilizing segment may be selected to be miscible with the curable components. Useful compatibilizing agents may include polyalkylene oxides (e.g., polypropylene oxide, polyethylene oxide), polycaprolactones, and combinations thereof. Commercially available examples include BYK W-9010 (BYK Additives and Instruments), BYK W-9012 (BYK Additives and Instruments), DISBERBYK 180 (BYK Additives and Instruments), and SOLPLUS D510 (Lubrizol Corporation). In some embodiments, the dispersant may be pre-mixed with the filler prior to combining the filler with the curable components. Such pre-mixing may facilitate the filled systems behaving like Newtonian fluids or enabling shear-thinning effects behavior.

The total amount of such additives is typically less than 20 weight percent, less than 15 weight percent, less than 10 weight percent, less than 5 weight percent, or less than 1 weight percent of the curable component.

The curable component includes the epoxy resin and the curing agent having at least two primary and/or secondary amino groups. Other optional materials can also be present such as a curing catalyst, toughening agent, and other optional additives. Any inorganic filler is not considered as part of the curable component. The curable component plus any optional inorganic filler is equal to the curable composition.

The amount of epoxy resin (including that that is included in the optional toughening agent), curing agent, polyamine adduct, and the like are determined based on the desired ratio of the moles of amino reactive hydrogens and the moles of epoxide groups. The moles of reactive amine hydrogens (—N—H groups) to moles of epoxide groups is often selected to be in a range of 1.5:1 to 1:1.5. For example, the ratio can be in a range of 1.3:1 to 1:1.3, in a range of 1.2:1 to 1; 1.2, in a range of 1.1:1 to 1:1.1, or in a range of 1.05:1 to 1:1.05.

The curable composition can include an optional inorganic filler. More than one inorganic filler can be used, if desired. Generally, any known inorganic fillers may be used. The inorganic fillers can be added to provide various properties to the final cured composition (e.g., strength), to alter the appearance of the final cured composition, or to alter the flow properties (e.g., thixotropic agents) of the curable composition.

The inorganic filler can have any desired form such as particles or fibers. The particles can be spherical, plate-like, acicular, or irregular. The inorganic filler can have any desired dimension. In some applications, the inorganic filler includes glass beads to help control the thickness of the curable composition and the resulting cured composition.

The inorganic fillers can be metal oxides, metal hydroxides, metal oxyhydroxides, metal silicates, metal borides, metal carbides, metal nitrides, and the like. Some inorganic fillers are glass (e.g., glass beads including hollow glass beads or glass fibers) or ceramic materials such as, for example, silicon oxide (e.g., fused or fumed silica), aluminum oxide (e.g., alumina), aluminum trihydroxide (ATH), boron nitride, silicon carbide, beryllium oxide, talc, marble powder, chalk, sand, mica powder, clays, slate powder, or zircon. Some inorganic filler are metals such as copper, aluminum, nickel, chromium, steel, or various alloys.

In some embodiments, the inorganic filler includes a thixotropic agent, which is often fumed silica. The thixotropic agent is added to lower the viscosity of the curable composition. The average particle size of the thixotropic agent is often no greater than 50 nanometers, no greater than 40 nanometers, no greater than 30 nanometers, no greater than 20 nanometers, or no greater than 10 nanometers and is often at least 1 nanometer, at least 2 nanometers, or at least 5 nanometers. The average particle size is that of the largest dimension and can be determined from an electron micrographic image.

The amount of the optional thixotropic agent is often in a range of 0 to 5 weight percent based on a total weight of the curable composition. The amount can be at least 0.5 weight percent, at least 1 weight percent, at least 1.5 weight percent, or at least 2 weight percent and can be up to 5 weight percent, up to 4.5 weight percent, up to 4 weight percent, up to 3.5 weight percent, up to 3 weight percent, up to 2.5 weight percent, or up to 2 weight percent.

To facilitate dispersion and increase inorganic filler loading, in some embodiments, the inorganic fillers may be surface-treated or coated. Generally, any known surface treatments and coatings may be suitable, including those based on silane, titanate, zirconate, aluminate, and organic acid chemistries. In some embodiments, the inorganic filler can be particles that are surface modified with an organic silane. For powder handling purposes, many fillers are available as polycrystalline agglomerates or aggregates with or without binder. In some embodiments, the inorganic fillers may include mixtures of particles and agglomerates of various size and mixtures.

The curing composition can contain 0 to 40 weight percent inorganic filler. The amount of the inorganic filler can be at least 0.5 weight percent, at least 1 weight percent, at least 2 weight percent, at least 5 weight percent, at least 10 weight percent, at least 15 weight percent, at least 20 weight percent and up to 40 weight percent, up to 35 weight percent, up to 30 weight percent, up to 25 weight percent, up to 20 weight percent, up to 15 weight percent, or up to 10 weight percent based on a total weight of the curable composition.

If the curable composition is a two-part composition, the first part often includes the curing agent for the epoxy resin that has at least two amino groups (i.e., primary and/or secondary amino groups). The first part can further include any optional materials having reactive amine hydrogen groups. For example, the first part can include an optional polyamine adduct formed by reacting a polyamine such as a diamine with an epoxy resin, and an optional curing catalyst. Any other materials such as additives, fillers (organic and/or inorganic), and/or toughening agents can be included in the first part provided it does not react with the other materials of the first part. If the toughening agent has reactive amine hydrogen groups, it is typically present in the first part.

The second part includes the epoxy resin. The adhesive promoter can be included with the epoxy resin in the second part, can be applied directly to the substrate, or can be combined with the first and second part during or after their mixing. Any other material such as additives, fillers (organic and/or inorganic), and toughening agents can be included in the second part provided it does not react with the other materials in the second part.

In some embodiments, the curable compositions may be prepared by mixing the first part and separately mixing the second part. Both parts may be mixed using any conventional mixing technique, including using a high shear mixer. In embodiments in which inorganic fillers are included in the curable compositions, any optional dispersants are usually pre-mixed with the inorganic filler prior to incorporating into the composition. Next, the two parts may be mixed using any conventional mixing technique to form the curable composition.

The two parts can be delivered to the bonding site in any suitable manner. In some embodiments, the two parts are dispensed from separate chambers and mixed. Thus, a dispenser is provided that contains at least two chambers. The first chamber contains the first part of the curable composition and the second chamber contains the second part of the curable composition. If desired, the various materials of the curable composition can be divided into more than two parts and the dispenser can have more than two chambers.

The cured composition is the reaction product of the curable composition. In some embodiments, the curable compositions may be capable of curing without the use of catalyst or curing accelerator. In other embodiments, a catalyst or curing accelerator is added. The curable composition can be cured at room temperature or elevated temperatures (e.g., greater than 30° C.). For example, the curable compositions may cure at typical application conditions, such as at room temperature without the need for elevated temperatures or actinic radiation (e.g., ultraviolet light). For example, the curable composition cures at room temperature, or at temperatures no greater than 30° C. such as no greater than 25° C., no greater than 20° C., no greater than 15° C., or no greater than 10° C. If desired, an optional post-curing step at an elevated temperature can be used after curing at room temperature.

The curable composition can be provided as a two-part composition. The two parts may be mixed prior to being applied to a substrate. Applying the curable composition can be carried out, for example, by dispensing the curable composition from a dispenser comprising a first chamber, a second chamber, and a mixing tip. The first chamber comprises the first part, the second chamber comprises the second part, and the first and second chambers are coupled to the mixing tip to allow the first part and the second part to flow through the mixing tip. After mixing, the two-part composition undergoes a curing reaction to form a structural adhesive or a protective coating.

Any suitable thickness of the cured composition may be present in the articles. In some embodiments, the curable compositions used to form the cured compositions have a thickness ranging from 5 microns to 10,000 microns, 25 micrometers to 10,000 micrometers, 100 micrometers to 5,000 micrometers, or 250 micrometers to 1,000 micrometers.

When used as a structural adhesive, the cured compositions often can be subjected to higher loads prior to debonding compared to those lacking the reactive primer compound. The increase load can increase by at least 20 percent, at least 30 percent, at least 40 percent, or at least 50 percent compared to cured adhesives without the reactive primer compound.

The cured compositions often can be extended further prior to debonding compared to those lacking the reactive primer compound. This stronger adhesion to the substrate often results in the failure mode being cohesive rather than adhesive. Cohesive failure is typically preferred over adhesive failure. That is, failure often occurs in the structural adhesive itself (i.e., cohesive failure) prior to failure at the interface between the structural adhesive and the substrate (i.e., adhesive failure).

The improved performance of the cured composition is believed to be attributable to the bonds formed between the reactive primer compound and the substrate and between the reactive primer compound and the polymeric matrix of the structural adhesive.

EXAMPLES

Unless otherwise noted or readily apparent from the context, all parts, percentages, ratios, etc. in the Examples and the rest of the specification are by weight.

TABLE 1

| Materials Used in the Examples | |
|---|---|
| Abbreviation | Description and Source |
| MMA | Methyl methacrylate, obtained from Sigma Aldrich, St. Louis, MO, USA |
| GMA | Glycidyl methacrylate, obtained from Sigma Aldrich, St. Louis, MO, USA |
| AcAcMA | 2-(methacryloyloxy)ethyl acetoacetate, obtained from Sigma Aldrich, St. Louis, MO, USA |

TABLE 1-continued

Materials Used in the Examples

| Abbreviation | Description and Source |
|---|---|
| EA | Ethyl acetate, obtained from Sigma Aldrich, St. Louis, MO, USA |
| VAZO 67 | 2,2'-azobis-(2-methylbutyronitrile), obtained under the trade designation "VAZO 67" from Sigma Aldrich, St. Louis, MO, USA |
| IOTG | Isooctylthioglycolate, obtained from Sigma Aldrich, St. Louis, MO, USA |
| AAA | Allyl acetoacetate, obtained from Sigma Aldrich, St. Louis, MO, USA |
| AGE | Allyl glycidyl ether, obtained from Sigma Aldrich, St. Louis, MO, USA |
| PETMP | Pentaerythritol tetrakis(3-mercaptopropionate), can be obtained from Sigma Aldrich, St. Louis, MO, USA |
| IRGACURE 651 | 2,2'-dimethoxy-2-phenylacetophenone, can be obtained from Sigma Aldrich, St. Louis, MO, USA |
| HD-Steel | Hot dipped galvanized steel coupon, obtained from ACT Test Panels, Hillsdale, MI, USA |
| E-Steel | Electro galvanized steel coupon, obtained from ACT Test Panels, Hillsdale, MI, USA |
| TOTDDA | 4,7,10-trioxa-1,13-tridecanediamine, obtained from BASF, Florham, NJ, USA |
| VERSAMID EH-30 | A tertiary amine-based accelerator for epoxy systems, obtained under the trade designation "VERSAMID EH-30" from Gabriel Phenoxies, Rock Hill, SC, USA |
| EPON 828 | An undiluted clear difunctional bisphenol A/epichlorohydrin derived epoxy resin having an epoxy equivalent weight of 185 to 192 grams/equivalent, obtained under the trade designation "EPON Resin 828" from Hexion Inc, Columbus, OH, USA |
| MX-154 | Surface-functionalized (with epoxy groups) core-shell rubber (CSR) dispersed in an epoxy resin (bisphenol A epoxy) obtained under the trade designation "KANE ACE MX-154" from Kaneka, (Pasadena, TX, USA). The core-shell rubber is a polybutadiene rubber and contains a blend of 100 nm and 200 nm particles. The nominal epoxy equivalent weight is 301 grams/equivalent and the core-shell rubber content is 40 ± 1 weight percent. |
| IRSA | 2K epoxy adhesive, obtained under the trade designation "3M Impact Resistant Structural Adhesive (IRSA) 07333" from 3M Company, St. Paul, MN, USA |
| Glass Beads | Acid-washed glass beads (212-300 μm), obtained from Sigma Aldrich, St. Louis, MO, USA |

T-Peel Test Method

T-Peel Test Panel Surface Preparation

Test panels (e.g., hot-dip galvanized steel, and electro galvanized steel) were cleaned with isopropyl alcohol-soaked paper towels to remove contaminants on the surface and were thoroughly dried. Some panels (where indicated) were abraded by using 3M SCOTCH-BRITE ROLOC surface conditioning discs (A CRS grade, 07480, 3M Company, St. Paul, MN) to remove any rust and oxide layer on the panel. Control panels were used without further treatment. Primed panels were prepared by applying primer compositions. Typical concentrations of primer compositions were 1-5 wt. % in ethyl acetate. Sponge swabs were used to apply primer compositions on target substrates. After primer application, solvent was quickly evaporated without heating.

Measurement of T-Peel and Extension

T-peel test was conducted according to ASTM D1876 using MTS Tabletop Test Systems from MTS (Eden Prairie, MN, USA). A crosshead speed of 2 inch/min was used for measurement of T-peel strength. Maximum extension data was also recorded. For each formulation, 5 samples were prepared and tested.

Preparatory Examples

AcAc (Acetoacetate) Containing Methacrylate Copolymer (AcAc Copolymer)

In a 100 mL round bottom flask with magnetic stir bar, 4.202 g of methyl methacrylate, 2.313 g of glycidyl methacrylate, 3.485 g of 2-(methacryloyloxy)ethyl acetoacetate, 0.05 g of isooctylthioglycolate, 0.2 g of VAZO 67, and 15 g of ethyl acetate were added. The mixture was stirred until it became a homogeneous solution and then was heated to 70° C. The mixture was continuously stirred at this temperature for at least 20 hours to complete the reaction. The resulting product was a clear transparent liquid. The reaction was confirmed by 1H NMR spectroscopy.

Primer A

In a 100 mL round bottom flask with magnetic stir bar, 4.073 g of allyl acetoacetate, 3.184 g of allylglycidyl ether, 7.000 g of pentaerythritol tetrakis(3-mercaptopropionate), 0.285 g of IRGACURE 651, and 14.256 g of ethyl acetate was added. The mixture was stirred until it became a homogeneous solution then was UV irradiated with two black UV light bulbs (Philips TL-D 15W, BLB). The mixture was continuously stirred during the UV irradiation for at least 30 minutes to complete the reaction. The resulting product was a clear transparent liquid. The reaction was confirmed by 1H NMR spectroscopy.

Adhesive Preparation

Premix: Polyamine Adduct Composition

To a 151.4 L Ross 3 shaft mixer kettle, 36.29 kg TOTDDA was added, followed by 20.87 kg MX-154 (containing epoxy resin and polybutadiene core-shell rubber particles) at a temperature of between 27-38° C., and mixed under nitrogen with the anchor blade at 35 revolutions per minute (rpm) and shear blade at 700 rpm for 30 minutes. The ratio of moles of amine hydrogen (i.e., moles of reactive amine hydrogen) to moles of epoxide groups in the mixture was 6:1. The mixture was then heated to 66° C., and the mixture was allowed to reach its peak exotherm, approximately 88° C., after which the mixing continued for an additional 10 minutes. The mixture was then cooled to 49° C. and an additional 12.52 kg of MX-154 at 27 to 38° C. was added and mixed under nitrogen for 30 minutes. The mixture was then heated to 66° C. and allowed to exotherm a second time, with an additional 10 minutes of mixing after the peak temperature of the exotherm was reached. The material was then transferred into containers and sealed. The polyamine adduct composition contains the polyamine adduct of the epoxy resin, toughening agent, and residual diamine.

Part a (Curative Composition)

To a 150 mL speed mixer container (FlackTek, Landrum, SC, USA) were added 52.09 g of Premix, 47.91 g of TOTDDA, and 3.00 g of VERSAMID EH-30. The container was sealed and was placed in a DAC 150 SPEEDMIXER (Synergy Devices Ltd, High Wycombe, United Kingdom). The contents were mixed at 2000 rpm for 4 min. The resulting mixture was a slightly yellow opaque viscous liquid.

Part B (Epoxy Composition)

To a 150 mL speed mixer container were added 55.87 g of EPON 828 and 44.13 g of MX-154. The container was sealed DAC 150 SPEEDMIXER. The contents were mixed at 2000 rpm for 4 min. The resulting mixture was an opaque viscous liquid.

Adhesive Resin AB (Part A+Part B)

To a 150 mL speed mixer container were added 30.00 g of the premixed part A, 63.24 g of the premixed part B, and 1.4 g of glass beads. The container was sealed DAC 150 SPEEDMIXER. Then the contents were mixed at 2000 rpm for 4 min. The resulting curable adhesive composition was applied to the primer coated test coupons for the T-peel test unless otherwise noted.

Example Preparation

Using a glass rod, the curable adhesive composition was applied evenly to the pre-cleaned/primed surface portion of a coupon to which it would adhere. On top of the curable adhesive composition, another pre-cleaned/primed coupon was placed to make a completed T-peel sample construction. The overlap area was 1 inch by 3.5 inches. The adhesive thickness is controlled by the diameter of the glass beads in the formulation, which were in a range of 212 to 300 micrometers. This mating process was by use of small binder clips (6 binder clips per sample). The samples were cured at room temperature (e.g., 20 to 25° C.) for 5 days before T-peel tests. Primed panels were used without further processes.

Table 2 examples were generated using abraded E-Steel panels with Adhesive Resin AB and 1 wt. % primer, where indicated in the table. Table 3 examples were generated using abraded E-Steel panels with Adhesive Resin AB and 5 wt. % primer, where indicated in the table. Table 4 examples were generated using un-abraded E-Steel panels with Adhesive Resin AB and 5 wt. % primer, where indicated in the table. Table 5 examples were generated using abraded HD-Steel panels with Adhesive Resin AB and 5 wt. % primer, where indicated in the table. Table 6 examples were generated using abraded E-Steel panels with 5 wt. % primer, where indicated in the table, and commercially available IRSA, wherein mixing of epoxy and curative parts was achieved by utilizing mixing nozzles which were included in the commercial available product.

TABLE 2

T- Peel Test with Abraded E-Steel Panels and Adhesive Resin AB

| Example | Primer (Concentration (wt. %)) | Sample # | Average Load (N/inch) | Averaged Average Load (N/inch) | Max extension (mm) | Averaged Max extension (mm) |
| --- | --- | --- | --- | --- | --- | --- |
| CE-A.1 | None | 1 | 11.79 | 12.02 | 119.56 | 115.79 |
|  |  | 2 | 12.26 |  | 112.02 |  |
| CE-B.1 | AcAc Copolymer (1 wt. %) | 1 | 11.65 | 11.06 | 123.75 | 123.16 |
|  |  | 2 | 10.46 |  | 122.56 |  |
| EX-1.1 | Primer A (1 wt. %) | 1 | 13.03 | 13.08 | 130.14 | 130.63 |
|  |  | 2 | 13.13 |  | 131.11 |  |

TABLE 3

T- Peel Test with Abraded E-Steel Panels and Adhesive Resin AB

| Example | Primer (Concentration (wt. %)) | Sample # | Average Load (N/inch) | Averaged Average Load (N/inch) | Max extension (mm) | Averaged Max extension (mm) |
| --- | --- | --- | --- | --- | --- | --- |
| CE-A.2 | None | 1 | 9.69 | 10.06 | 113.98 | 115.56 |
|  |  | 2 | 10.43 |  | 117.14 |  |
| CE-C.1 | AcAc Copolymer (5 wt. %) | 1 | 8.25 | 10.72 | 105.59 | 117.08 |
|  |  | 2 | 13.2 |  | 128.57 |  |
| EX-2.1 | Primer A (5 wt. %) | 1 | 11.59 | 15.06 | 126.75 | 133.00 |
|  |  | 2 | 18.52 |  | 139.24 |  |

TABLE 4

T- Peel Test with Un-abraded E-Steel Panels and Adhesive Resin AB

| Example | Primer (Concentration (wt. %)) | Sample # | Average Load (N/inch) | Averaged Average Load (N/inch) | Max extension (mm) | Averaged Max extension (mm) |
|---|---|---|---|---|---|---|
| CE-A.3 | None | 1 | 13.28 | 10.08 | 111.55 | 101.1 |
|  |  | 2 | 6.88 |  | 90.64 |  |
| CE-C.2 | AcAc Copolymer (5 wt. %) | 1 | 12.52 | 9.5 | 113.33 | 99.34 |
|  |  | 2 | 6.48 |  | 85.35 |  |
| EX-2.2 | Primer A (5 wt. %) | 1 | 10.86 | 11.54 | 122.77 | 124.4 |
|  |  | 2 | 12.23 |  | 126.03 |  |

TABLE 5

T- Peel Test with Abraded HD-Steel Panels and Adhesive Resin AB

| Example | Primer (Concentration (wt. %)) | Sample # | Average Load (N/inch) | Averaged Average Load (N/inch) | Max extension (mm) | Averaged Max extension (mm) |
|---|---|---|---|---|---|---|
| CE-A.4 | None | 1 | 10.09 | 9.61 | 106.05 | 101.16 |
|  |  | 2 | 9.13 |  | 96.27 |  |
| CE-C.3 | AcAc Copolymer (5 wt. %) | 1 | 8.42 | 8.12 | 89.2 | 86.07 |
|  |  | 2 | 7.82 |  | 82.94 |  |
| EX-2.3 | Primer A (5 wt. %) | 1 | 10.82 | 10.23 | 110.67 | 110.41 |
|  |  | 2 | 9.64 |  | 110.16 |  |

TABLE 6

T- Peel Test with Abraded E-Steel Panels and Commercially Available IRSA

| Example | Primer (Concentration (wt. %)) | Sample # | Average Load (N/inch) | Averaged Average Load (N/inch) | Max extension (mm) | Averaged Max extension (mm) |
|---|---|---|---|---|---|---|
| CE-A.5 | None | 1 | 17.53 | 19.26 | 142.16 | 144.13 |
|  |  | 2 | 20.98 |  | 146.10 |  |
| EX-2.4 | Primer A (5 wt. %) | 1 | 25.13 | 25.41 | 150.97 | 151.33 |
|  |  | 2 | 25.68 |  | 151.69 |  |

What is claimed is:

1. A reactive primer compound comprising a thiol-ene reaction product of a mixture comprising:
    (a) a first compound comprising at least two thiol groups;
    (b) a second compound comprising an ethylenically unsaturated group and a diketone group of formula —(C=O)—CH$_2$—(C=O)—; and
    (c) a third compound comprising an ethylenically unsaturated group and oxirane group.

2. The reactive primer compound of claim 1, wherein the first compound has 2 to 4 thiol groups.

3. The reactive primer compound of claim 1, wherein the first compound further comprises an oxy group, imino group, carbonyloxy group, carbonylimino group, alkyleneoxy-alkylene group, oxy-alkylene group, heterocyclic ring, or a combination thereof.

4. The reactive primer compound of claim 1, wherein the reactive primer compound has an unreacted thiol group.

5. The reactive primer compound of claim 1, wherein the first compound is of Formula (I)

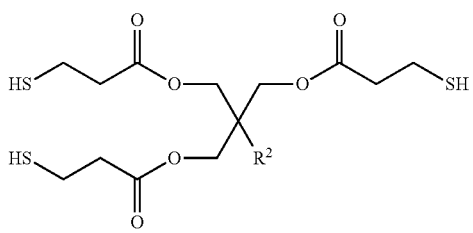

(I)

wherein $R^2$ is methyl, ethyl, or —CH$_2$—O—(CO)—CH$_2$CH$_2$—SH.

6. The reactive primer compound of claim 1, wherein the first compound is

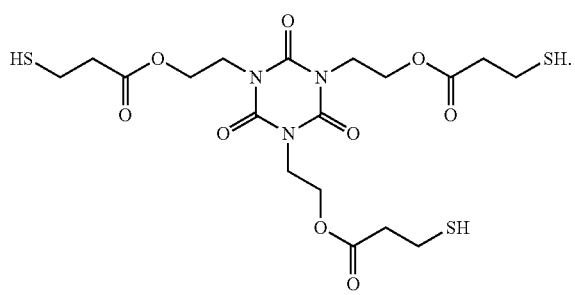 [SMILES: O=C(CCS)OCCn1c(=O)n(CCOC(=O)CCS)c(=O)n(CCOC(=O)CCS)c1=O]

7. The reactive primer compound of claim 1, wherein the first compound is of Formula (II)

$$HS \left[ \underset{}{\phantom{xx}} O \right]_n SH \qquad (II)$$

wherein n is an integer in a range of 1 to 10.

8. The reactive primer compound of claim 1, wherein the first compound is of Formula (III)

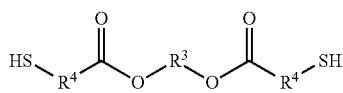

(III)

wherein $R^4$ is an alkylene having 1 to 4 carbon atoms; and $R^3$ is an alkylene having 1 to 6 carbon atoms.

9. The reactive primer compound of claim 1, wherein the second compound is of Formula (IV)

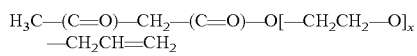

(IV)

wherein x is an integer in a range of 0 to 5.

10. The reactive primer compound of claim 1, wherein the second compound is of Formula (V)

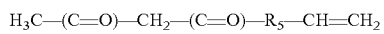

(V)

wherein $R^5$ is an alkylene having 2 to 6 carbon atoms.

11. The reactive primer compound of claim 1, wherein the second compound is of Formula (VI)

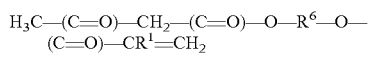

(VI)

wherein $R^6$ is an alkylene having 2 to 6 carbon atoms and $R^1$ is hydrogen or methyl.

12. The reactive primer compound of claim 1, wherein the third compound is

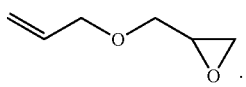

13. The reactive primer compound of claim 1, wherein the third compound is of Formula (VII)

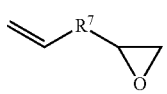

(VII)

wherein $R^7$ is an alkylene having 2 to 10 carbon atoms.

14. The reactive primer compound of claim 1, wherein the third compound is of Formula (VIII)

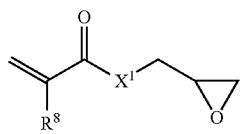

(VIII)

wherein $R^8$ is hydrogen or methyl; and $X^1$ is oxy or —NH—.

15. The reactive primer compound of claim 1, wherein the third compound is of Formula (IX)

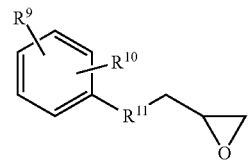

(IX)

wherein $R^9$ is an optional alkoxy group;

$R^{10}$ is vinyl, allyl, or allyloxy; and $R^{11}$ is oxy or —$CH_2$—O—.

16. An article comprising a first metal-containing substrate and a first surface of a first primer layer positioned adjacent to the first metal-containing substrate, the first primer layer comprising a first reactive primer compound of claim 1, the first reactive primer compound being chelated to a metal in the first metal-containing substrate.

17. The article of claim 16, wherein the article further comprises a curable composition positioned adjacent to a second surface of the first primer layer opposite the first surface of the first primer layer, the curable composition comprising an epoxy resin and a curative for the epoxy resin.

18. The article of claim 17, wherein the article further comprises a second primer layer adjacent to the curable composition opposite the first primer layer, the second primer layer comprising a second reactive primer compound; and a second metal-containing substrate positioned adjacent to the second primer layer opposite the curable composition, the second reactive primer compound being chelated to the second metal-containing substrate.

19. A cured article, wherein the cured article comprises a cured reaction product of the curable composition in claim 17, wherein the cured composition is covalently bonded to the first primer layer, the second primer layer, or both.

* * * * *